United States Patent
Twidale et al.

[15] 3,695,015
[45] Oct. 3, 1972

[54] DEFLECTOR ARRANGEMENT FOR SINGLE OR DOUBLE WINDOW LAYING, CONVERTIBLE TABLE FOR SWATHERS

[72] Inventors: William H. Twidale, Islington, Ontario; Mark K. Byrnes, Mississauga, Ontario, both of Canada

[73] Assignee: Massey-Fergusen Industries Limited, Toronto, Ontario, Canada

[22] Filed: Sept. 7, 1971

[21] Appl. No.: 178,226

[52] U.S. Cl. ..................56/181, 56/192, 198/36
[51] Int. Cl. ...........................................A01d 43/00
[58] Field of Search ..........56/181, 192, 11.2; 198/36

[56]              References Cited

UNITED STATES PATENTS 3,214,002   10/1965   Kirkpatrick et al..........56/181
3,343,347   9/1967   Burrough et al..............56/181

*Primary Examiner*—Antonio F. Guida
*Attorney*—Gerhardt, Greenlee & Farris

[57]                  ABSTRACT

A deflector arrangement for a transversely shiftable swath table assembly for windrower type harvester is comprised of two individually hinged overlying deflector blades at one outer end of the table assembly. The one deflector blade adjacent said end is used only for laying a single windrow and is inactive when laying a double windrow. The other deflector blade is normally spring biased away from said end of the table assembly in one position and the table assembly is provided with an actuating member adapted to move the other deflector blade against the end of the table assembly when the table assembly is shifted to the other position.

6 Claims, 8 Drawing Figures

PATENTED OCT 3 1972 3,695,015

INVENTORS
WILLIAM H. TWIDALE
BY MARK K. BYRNES

*Gerhardt, Greenlee & Farris*
ATTORNEYS

INVENTORS
WILLIAM H. TWIDALE
BY MARK K. BYRNES

*Gerhardt, Greenlee & Farris*
ATTORNEYS

DEFLECTOR ARRANGEMENT FOR SINGLE OR DOUBLE WINDOW LAYING, CONVERTIBLE TABLE FOR SWATHERS

BACKGROUND OF INVENTION

The present invention relates to a harvesting machine of the windrower type and more in particular to a harvesting machine having a shiftable convertible table assembly for selective location of windrows relative to the machine.

In known harvesting machines of the windrower type the windrower advances over a field of standing crop such as grain or hay for cutting of the crop and depositing of the cut crop in windrows behind the machine for subsequent pick-up by a harvesting combine or the like. Conventionally, such windrower type harvesting machines, or swathers, include a header or table assembly which has a reciprocating knife mechanism along its transverse leading edge over which the cut crop is directed onto the table assembly. The table assembly is equipped with one or more conveyor means adapted to convey the cut crop to either side of the table assembly for disposal through a side opening or to a center area in case of a center delivery type swather.

However, as is known, crop conditions, that is, thickness of the plants in relation to any given field area, varies widely with different fields or even in the same field.

Thus, where the crop is relatively thin in relation to the field area, a light windrow is formed causing a waste in efficiency and capacity of the combine, which may be equipped to handle heavier windrows at full capacity. To overcome this drawback and to effectively utilize the full capacity of the combine, windrowers, or swathers, have been proposed adapted to lay double windrows, i.e., two windrows side by side, for subsequent simultaneous pick-up by the combine. These known double-windrow-laying type of swathers usually employ transversely shiftable and reversible conveyor means and crop dispersing mechanism associated with the table of the machine such, that the crop will automatically be dispersed to the left or right of the machine during successive passages of the machine across the field. However, serious difficulties have been encountered in known double-windrow-laying swathers due to the inability of effectively controlling side by side positioning of the pair of windrows and in the prevention of cut crops being placed on the standing crop which, of course, is undesirable. Furthermore, in order to accommodate combines of varying pick-up capacities, it is preferred to lay the double windrow of cut crops as close together side by side as possible, leaving only a small space between adjacent windrows necessary for effective and quick drying of the cut crop. This could not effectively be accomplished with known double-windrow-laying swathers.

The present invention provides improved means to overcome the inefficiency and other disadvantages of prior art windrow laying harvesting machines by provision of dual conveyor means associated with the header or table assembly of the machine and adapted to be selectively shifted simultaneously to either the right or left of the machine for alternate left or right discharge of the cut crop to lay single side discharge windrows adjacent the standing crop or closely spaced double windrows. Means are also provided to selectively shift the divided conveyor means to opposite ends of the table assembly for center discharge of the cut crop in a single windrow where standing crop conditions permit.

Primarily, improved deflector means are provided along side the table assembly which are effective on respective positioning of the conveyor means or prevent placing of cut crop onto the standing crop during laying of side discharge windrows or double windrows side-by-side.

SUMMARY OF INVENTION

Accordingly, it is the primary object of the present invention to provide improved means for a windrower type harvesting machine having a divided reversible conveyor means selectively shiftable from left to right or vice versa for alternate left or right discharge of cut crop to lay side discharge windrows adjacent the standing crop or closely spaced double windrows and which can also be used for alternatively separating movement towards opposite ends of the table to lay a center delivery single windrow.

Another object of the present invention resides in the provision of deflector means of improved structure to effectively prevent placing of cut crop on top of standing crop when laying a windrow adjacent the standing crop.

A further object of the present invention is the provision of means for operatively interconnecting the present improved deflector means with mechanisms associated with the shiftable conveyor means such as to place the improved deflector means of the present invention in operative or inoperative position in response to the shifted position of the conveyor means.

Another object of the present invention resides in the provision of improved deflector means, selectively operative in response to positioning of the conveyor means and of such structure as not to interfere with proper functioning of the machine and which will not become clogged during operation.

The foregoing and other objects and features of the present invention will become more fully apparent by the following detailed description when read in conjunction with the attached drawings illustrating a preferred embodiment thereof.

DESCRIPTION OF THE DRAWINGS

The accompanying drawings illustrate preferred embodiment of invention in which.

DETAILED DESCRIPTION OF THE INVENTION

Figure 1:
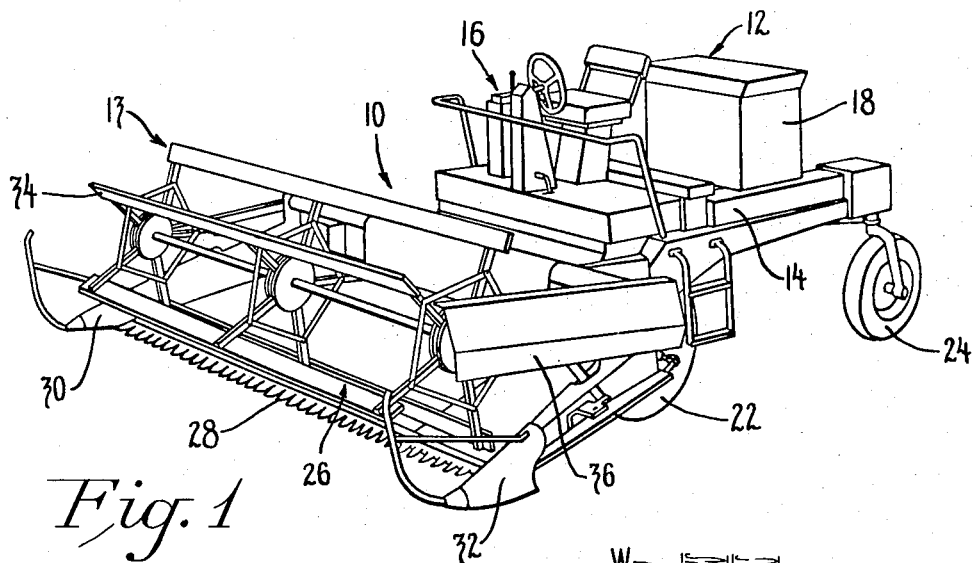
FIG. 1 is a perspective illustration of a windrow type harvesting machine embodying the present invention.

Referring now to FIG. 1 in the drawings there is illustrated a windrower type harvesting machine generally indicated at 10 and including a propelling means 12 and a header 13 forwardly thereof. Propelling means 12 comprises a platform 14 which carries an operator station 16 and a power source such as an engine 18. Platform 14 is supported on a pair of opposite front wheels 20 and 22 respectively and a rear caster wheel 24.

The header 13 is comprised of a table assembly 26 mounted on the platform 14 by conventional means and adjustable relative to the ground. Table assembly 26 has a transverse leading edge defined by a reciprocating knife 28. The reciprocating knife 28 is confined between a pair of opposite side end dividers 30 and 32 respectively which are attached to the table assembly 26. The distance between the dividers 30 and 32 defines the width of the swath being cut by the reciprocating knife 28, as is known.

Suspended above the table assembly 26 is a rotating reel 34 which is rotatable by conventional drive means such as sprocket and chain arrangement, or the like 36. Reel 34, as is known, is adapted to sweep the standing crop over the reciprocating knife 28 and may be individually adjustable relative to table assembly 26 and in response to standing crop conditions.

Figure 2:
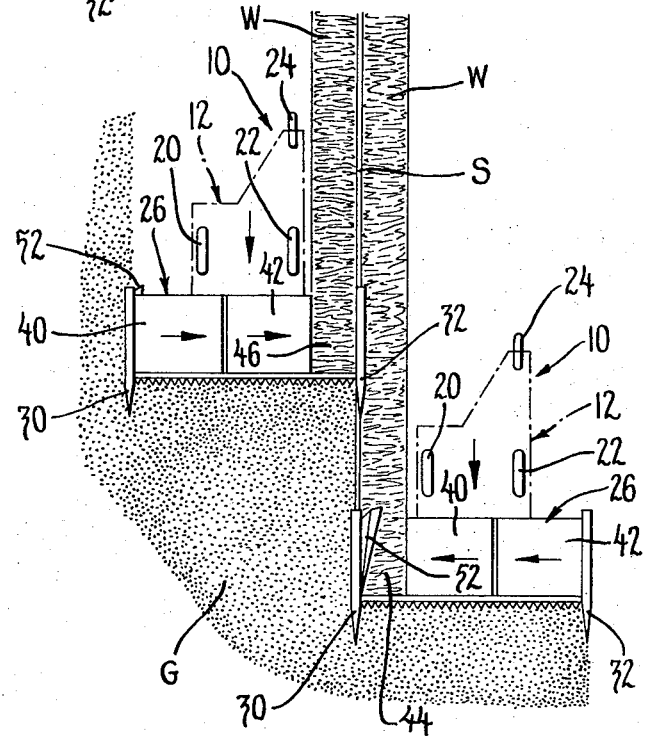
FIG. 2 is a schematic illustration representing the windrow type harvesting machine of FIG. 1 at two successive turns over the crop field to lay a double windrow in accordance with the present invention.
Figure 3:
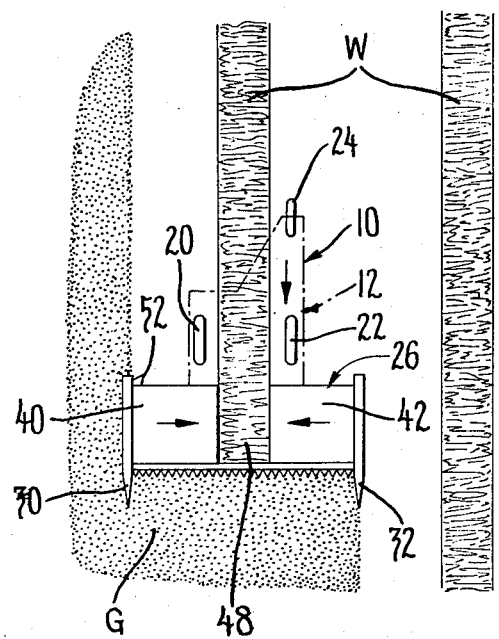
FIG. 3 is another schematic illustration illustrating the windrower type harvesting machine of FIG. 1 in the operation of laying a center delivery type single windrow in accordance with the present invention.
Figure 4:
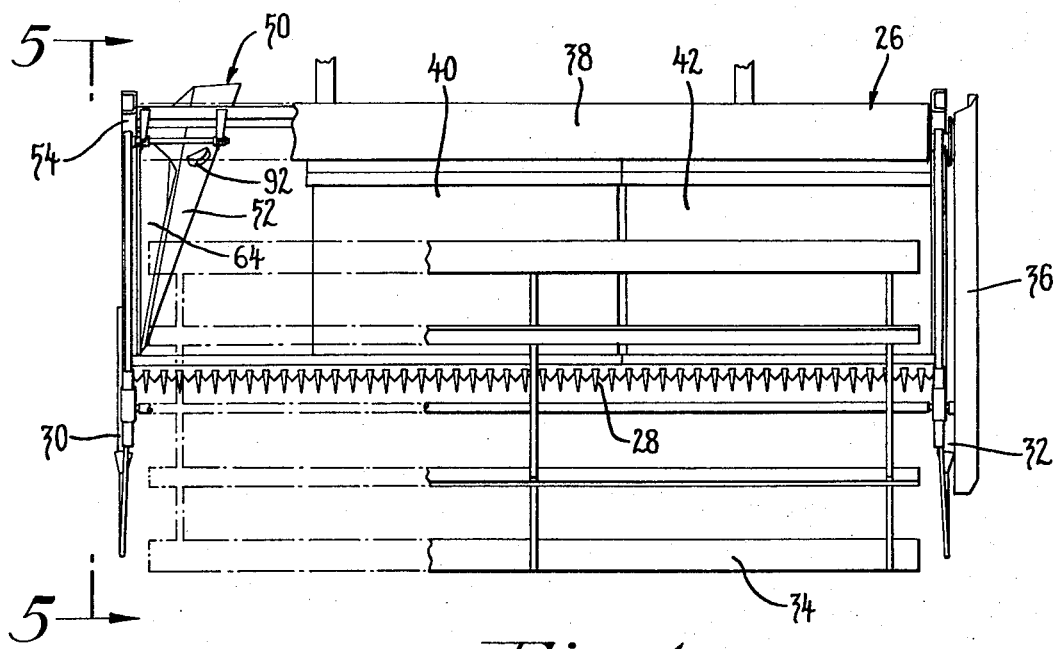
FIG. 4 is a top plan view of the table portion of the harvesting machine in FIG. 1 with parts thereof broken away and shown in phantom lines for clarity of illustration.
Figure 5:
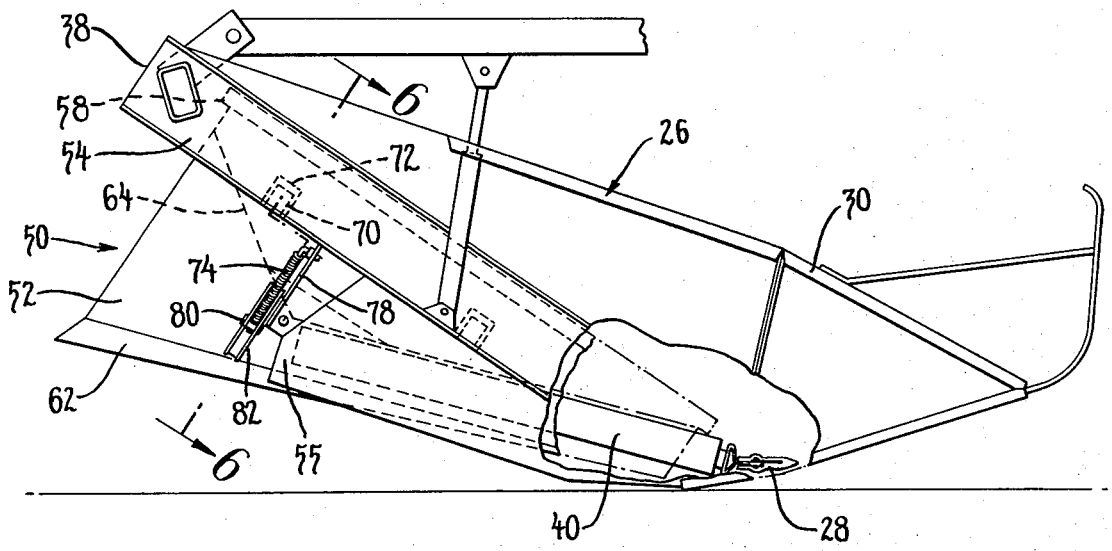
FIG. 5 is a right hand side view of the table mechanism shown in FIG. 4 and more clearly illustrating the arrangement of the improved deflector means.

Table assembly 26, as more clearly indicated in FIGS. 2 to 4, includes a frame 38 which supports a pair of individual conveyors 40 and 42 respectively which are conjointly or independently operable for shifting movement within the frame 38 in the table assembly 26. The particular details and drive arrangement for conveyor means 40, 42 do not form a part of the present invention and are thus not illustrated. Suffice it to say that, with reference to FIGS. 2 and 3, conveyor means 40, 42 may be shifted conjointly towards the left of the machine (in the direction of travel) to convey the cut crop from the left to a right side opening 44, as seen in the bottom illustration in FIG. 2 or, conversely, may be shifted from the left to the right, in direction of travel, and their direction of movement may be reversed to move the cut crop from the right to the left of the machine through an opposite side opening 46, as seen in the top illustration in FIG. 2. Alternately, as seen in FIG. 3, conveyor means 40, 42 may be shifted apart towards opposite ends of the table assembly 26 and their direction of movement may be oppositely reversed so as to shift the cut crop from the ends of the table assembly towards the center of the table assembly and through a center opening 48.

Referring now to FIGS. 4 to 8, the right side of the table assembly 26 as seen in the direction of travel of the machine is provided with a deflector assembly 50 which include a first deflector member 52 extending laterally alongside the outer end of table assembly 26 adjacent and inwardly of the divider 30. As most clearly seen in FIG. 5, deflector blade 52 is suspended downwardly from an inclined support member 54 of table frame 38 and is hingedly attached thereto by means of curled-over bead portion 56 and retained by means of a clamp member 58 which is secured to support member 54 by means of fasteners 60, as most clearly shown in FIG. 8. Deflector blade 52 is of relatively large dimension and extends downwardly towards the ground and is provided along its lower end with an angularily offset edge portion 62.

Figure 8:
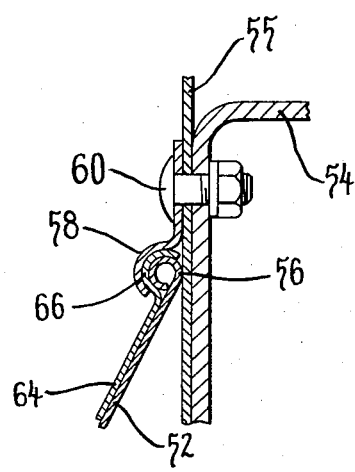
FIG. 8 is an enlarged fragmentary illustration of the pivoted hinge attachment for the present improved deflector means.

Deflector assembly 50 includes a second deflector blade 64 of substantially smaller dimension than deflector blade 52. Deflector blade 64 is arranged in parallel, overlying relationship to deflector blade 52 and is similarly hinged to support member 54 by means of a curled-over rim or bead portion 66 which is curled around bead portion 56 of deflector blade 52, as seen in FIG. 8, for retainment by the same clamp assembly 58. Thus, both deflector blades 52 and 64 are pivotal around a common pivot point. The lower edge of second deflector blade 64 is similarly provided with an angularly offset portion 68 for a purpose to appear.

Figure 6:
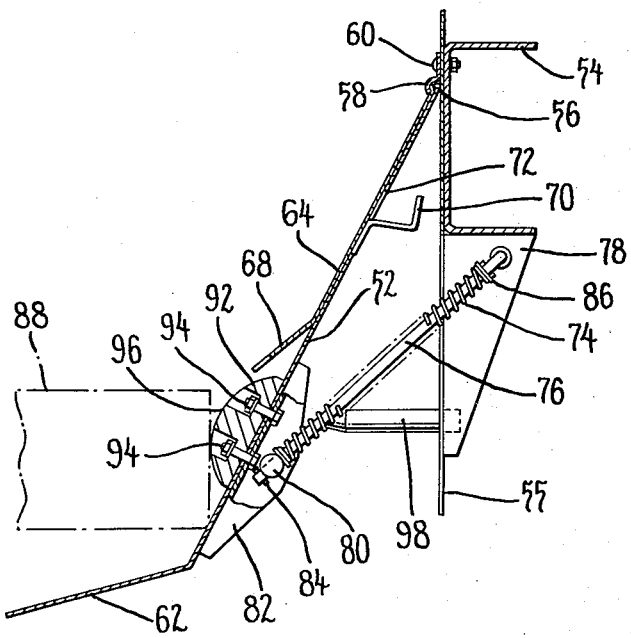
FIG. 6 is a cross section through the table and deflector mechanism shown in FIG. 5 as seen along lines 6—6 thereof.
Figure 7:
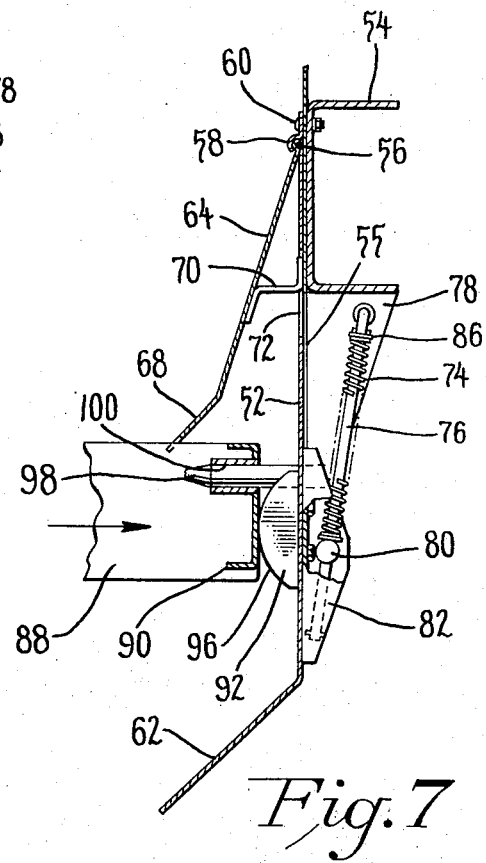
FIG. 7 is a view similar to FIG. 6 illustrating an alternate position of the deflector mechanism shown therein.

As most clearly shown in FIG. 6 and 7, the second deflector blade 64 carries a bracket 70 attached to the rear thereof which projects through an aperture 72 provided in the first deflector blade 52. Bracket 70 provides a stop member for second deflector blade 64 and is adapted to abut against the side of support member 54 in one position of the deflector assembly, as shown in FIG. 7, to thereby separate deflector blade 64 from deflector blade 52 in response to the shifted position of the table assembly 26, as will be more fully explained hereafter.

Deflector blade 52 is normally spring biased away from the support member 54 of frame 38 in an inwardly upwardly directed position as shown in FIG. 6 by means of an extension spring 74. Extension spring 74 is arranged around a rod 76 which is pivotally attached to a bracket 78 extending from frame member 54. The other end or rod 76 freely extends through a pivotal socket 80 which is secured to a bracket 82 at the lower rear end of deflector blade 52. The end of rod 76 is prevented against separation from pivot socket 80 by means of a cotter pin or the like 84. The upper end of rod 76 is provided with a stationary spring retainer 86 to thereby retain compression spring 74 between socket 80 and retainer 86. Thus, as illustrated in FIG. 6, by means of expansion of spring 74 deflector blade 52 is pivoted away from frame support member 54 in an inwardly upwardly directed position and in which deflector blade 64 is caused to lie flat on the upper portion of deflector blade 52. In this position, the stop bracket 70 freely extends through the aperture 72 in deflector blade 52 and into the space between the deflector blade and the frame support member 54 by means to be described hereafter. In this position spring 74 will be compressed between the pivot socket 80 and the upper spring retainer 86 whereas the lower end of rod 76 is caused to slide through the socket 80. The second deflector blade 64, in the position shown in FIG. 7, is maintained in an angularly offset position relative to deflector blade 52 by means of abutment of stop bracket 70 against the side of frame support member 54.

Means associated with the table assembly 26 and deflector blade 52 are provided to move the deflector blade assembly around pivot 56–58 from the position of FIG. 6 to the position shown in FIG. 7. These means include an actuating member 88 operably connected to the conveyor means 40 to be shiftable therewith. Actuating member 88 extends a distance outwardly of conveyor 40 and comprises a generally hollow frame member having a closed outer end 90. The front side of deflector blade 52 is provided with an abutment member 92 in the form of a block attached to the deflector blade 52 by means of fasteners 94 which may simultaneously serve for attachment of bracket 82 to the rear of deflector blade 52. The block 92, which may be of wood or similar noise and shock reducing material, has a convex outer surface 96 which is in contact with the closed end 90 of actuating member 88 of the table assembly.

When table assembly 26, respectively conveyor means 40–42, is shifted to the left of the machine in the direction of travel as shown at the right in FIG. 2, the expansible force of spring 74 causes the deflector blade 52 to be moved away from frame support member 54 until block 92 abuts against the end 90 of actuating member 88 of the table assembly. This position of the deflector assembly is shown in FIG. 6.

As the conveyor means 40–42 are shifted from the left to the right, i.e., to the position shown at the left in FIG. 2, the actuating member 88 which is connected to the conveyor means is operative, due to its abutment against block 92, to move deflector blade 52 against frame support 54 thereby compressing spring 74. This causes deflector blade 64 to separate from deflector blade 52 by means of abutment of stop bracket 70 against the outside of frame support member 54.

With reference to the illustration in FIG. 3 when the conveyor means 40–42 are shifted away from each other towards opposite ends of the table assembly, the deflector blade assembly 50 will be moved to the same position as that shown in FIG. 7 due to conveyor means 40 being shifted to the right of the machine, the same as in the left illustration in FIG. 2.

Upon shifting of conveyor means 40 alone or conjointly with conveyor means 42 towards the right of the table assembly, in the direction of travel, actuating member 88 is caused to engage an alignment member 98 in the form of a pin which is attached to a side member 55 of the frame 38 for extension therefrom. The stationary alignment pin 98 is adapted to extend through an aperture (not shown) provided in deflector blade 52 by movement of deflector blade 52 towards frame support 54. Subsequently, alignment pin 98 is caused to extend through an aperture 100 provided in the closed outer end 90 of actuating member 88 to thereby align and retain actuating member 88 in aligned position relative to the frame 38 to prevent misalignment of the table assembly and subsequent noise and wear. This arrangement, however, may be optional and can be dispensed within certain other applications.

In operation of the device and with reference to the diagram in FIG. 2, the windrower 10 of the present invention is advanced across the field of standing grain G first in a position to discharge the cut crop at the right side of the machine to law a windrow W along-side the right front wheel 22 as shown at the right in FIG. 2 and closely adjacent the standing crop infield G. To accomplish this, the conveyor means 40–42 are conjointly shifted transversely across the table assembly 26 towards the left as seen in the direction of travel. The direction of movement of the conveyors in this instance is from left to right towards the right side opening 46 from which the cut crop is discharged to form a windrow W. In this position of the table assembly 26, deflector blade 52 will be in the position as shown in FIG. 6 by means of extension of coil spring 74. In this position of the deflector Blade 52 the angularly disposed bottom edge portion 62 effectively deflects the cut crop away from the standing crop to form a first windrow W, spaced a small distance S from the standing crop in field G to permit the left divider 32 to move therealong parallel to first windrow W while at the same time preventing divider 32 from moving into the first windrow upon a preceeding passage of windrower 10 across field G, as shown at the left in FIG. 2.

Upon subsequent parallel return passage of windrower 10 across the filed, the conveyor means 40–42 are then shifted from the left to the right of the table assembly, as shown in the left illustration of FIG. 2, and the movement of the conveyor means is reversed to discharge the cut crop through the left side opening 46 to form an adjacent windrow W along the left front wheel 22 of the windrower. As will be noted, the two windrows W will be closely adjacent and parallel to each other with only a small space S between them to facilitate drying of the cut crop, this space being provided by the divider 32.

The foregoing operations can then be subsequently repeated on successive turns of the windrower 10 across the field G to lay a plurality of closely spaced double windrows for subsequent simultaneous pick up by a combine.

With reference to FIG. 2, in the second movement of the windrower 10 across the field G, at the left in FIG. 2, deflector member 52 is in inactive position, as shown in FIG. 7, due to the shifting of the conveyor means 40–42 from the left to the right of the table assembly. By this, the deflector member 52 is moved against frame support member 54 by means of actuating member 88 as previously explained. In this position, the angularly offset second deflector member 64 will be operative to effectively guide the cut crop away from the standing crop and onto the conveyor means 40–42.

With reference to the diagram in FIG. 3, which illustrates laying of a single windrow in view of a heavier standing of crop in field G, conveyor means 42 is separated from conveyor means 40 and shifted to the opposite side of table assembly 26 and its direction of movement is reversed opposite to that of conveyor means 40. In this position of conveyor means 40–42, center opening 48 is exposed through which the cut crop is delivered from opposite ends by opposite movement of conveyor means 40–42 to lay a single center discharge windrow W. Here likewise, deflector member 52 is in inactive position, as in FIG. 7, since conveyor means 40 is shifted to the right of the table assembly and angularly offset second deflector means 64 is active to guide the cut crop away from the standing crop and onto the conveyor means 40.

Evidently, since the cut crop is discharged at the center or side of the machine which is remote from the standing crop, it is only necessary to guide the cut crop onto the conveyor means, which is done by the second deflector blade 64.

Upon successive passages of windrower 10 across the field G and parallel to any preceding single windrow W a plurality of single windrows can be laid parallel to each other but a substantial distance apart for individual pick up by a combine.

It will be appreciated from the foregoing disclosure that the windrower machine of the present invention is effectively adaptable for laying of double windrows in such a fashion that a pair of windrows are closely spaced adjacent each other to accommodate combines of varying pick up width capacities.

Similarly, by provision of the present improved deflector means, at the standing crop side of the windrower, the cut crop is effectively diverted away from the standing crop to be gathered in a precisely controlled windrow behind the machine.

Although the present invention has been described by means of a preferred embodiment it will be obvious to those skilled in the art that various modifications in detail and arrangement can be made without departing from the spirit and essential characteristics of the invention as defined by the scope of the appended claims.

What we claim is:

1. Deflector arrangement for windrower type harvester having a table assembly including a table frame and a transversely shiftable crop receiving and delivering assembly adaptable to deliver cut crop selectively toward either end of the table assembly for disposal in windrows behind said harvester, said deflector arrangement comprising in combination a first deflector member hingedly attached to the table frame adjacent one outer end of said table assembly a second deflector member underlying said first deflector member and similarly hingedly supported on said table frame; resilient means between said table frame and said second deflector member to normally retain said second deflector member in a first position away from the outer end of said table assembly, said table assembly having means movable therewith and adapted to move said second deflector member into a second position towards said one outer end of said table assembly, means associated with said first deflector member operative to separate said first deflector member from said second deflector member when the second deflector member is moved into its second position, and said crop receiving and delivery assembly comprising conveyor means transversely shiftable in opposite direction into a first position towards that end of said table assembly opposite said deflector members for laying a first windrow and into a second position towards the end of the table assembly where said deflector members are located for laying a second windrow; said second deflector member in said second position of said crop receiving and delivery assembly being effective to divert the cut crop away from the standing crop.

2. Deflector arrangement as defined in claim 1, said first and second deflector members each comprising a deflector blade angularly extending from said frame in a direction laterally across one outer end of said table assembly; said means separating said first deflector blade from said second deflector blade and said frame comprising a stop bracket attached to said first deflector blade for free extension through an opening in said second deflector blade and alternate selective abutment against said table frame in the second position of said second deflector member.

3. Deflector arrangement as defined in claim 1, in which said resilient means comprises spring.

4. Deflector arrangement as defined in claim 1, said second deflector member being provided with an abutment at one side thereof inwardly of said table assembly; said means adapted to move said second deflector towards said one outer end of said table assembly comprising an actuating member associated with said conveyor means and having an outer end defining a contact surface for engagement with said abutment to move said second deflector member towards said one outer end of said table assembly upon shifting of said conveyor means into said second position; said abutment having a convex outer surface for rolling contact upon said outer end contact surface of said actuating member.

5. Deflector arrangement as defined in claim 4, said outer end of said actuating member having an aperture; said table frame being provided with an alignment member extending outwardly therefrom; said second deflector member being provided with an opening adjacent said abutment; said alignment member comprising a pin for extension through said opening of said second deflector member and into said aperture of said outer end of said actuating member upon movement of said second deflector member towards said one end of said table assembly to thereby lock said second deflector member to said table frame and to said conveyor means.

6. Deflector arrangement as defined in claim 1, said first and second deflector members being hingedly attached to said table frame around a common fixed pivot connection.

* * * * *